M. MacFARLAND.
STARTING MECHANISM.
APPLICATION FILED JAN. 6, 1913.

1,080,642.

Patented Dec. 9, 1913.
2 SHEETS—SHEET 1.

WITNESSES:
H. W. Meade
S. W. Atherton.

INVENTOR
Merle Mac Farland
BY
A. M. Wooster
ATTORNEY

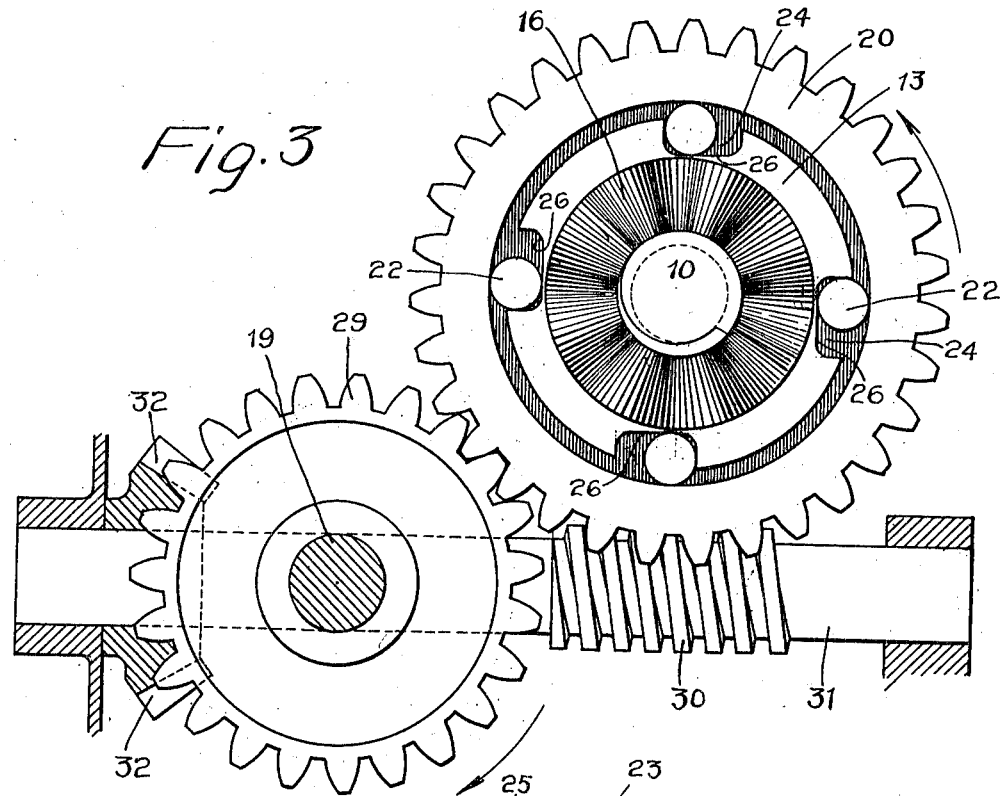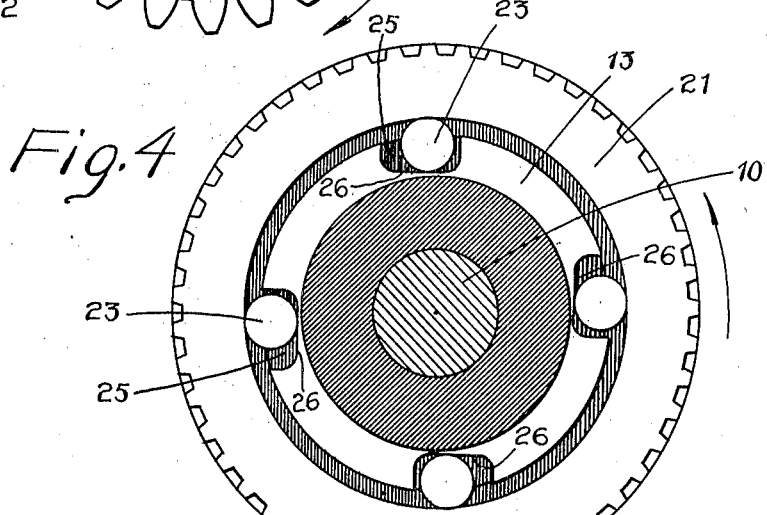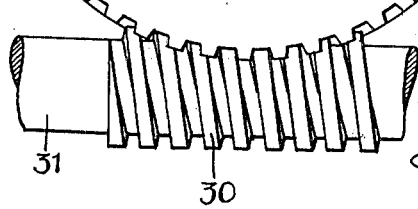

UNITED STATES PATENT OFFICE.

MERLE MacFARLAND, OF MAPLEWOOD, NEW JERSEY, ASSIGNOR TO COLUMBIA NUT AND BOLT COMPANY, INCORPORATED, OF BRIDGEPORT, CONNECTICUT, A CORPORATION OF NEW YORK.

STARTING MECHANISM.

1,080,642.   Specification of Letters Patent.   Patented Dec. 9, 1913.

Application filed January 6, 1913. Serial No. 740,411.

*To all whom it may concern:*

Be it known that I, MERLE MACFARLAND, a citizen of the United States, residing at Maplewood, county of Essex, State of New Jersey, have invented an Improvement in Starting Mechanism, of which the following is a specification.

This invention has for its object to provide a strong, durable and thoroughly reliable starting mechanism for explosive engines adapted to be operated by an electric motor which when the engine starts is converted into a generator.

With these and other objects in view the invention consists in certain constructions and in certain parts, improvements and combinations which will be hereinafter described and then specifically pointed out in the claims hereunto appended.

Figure 1:
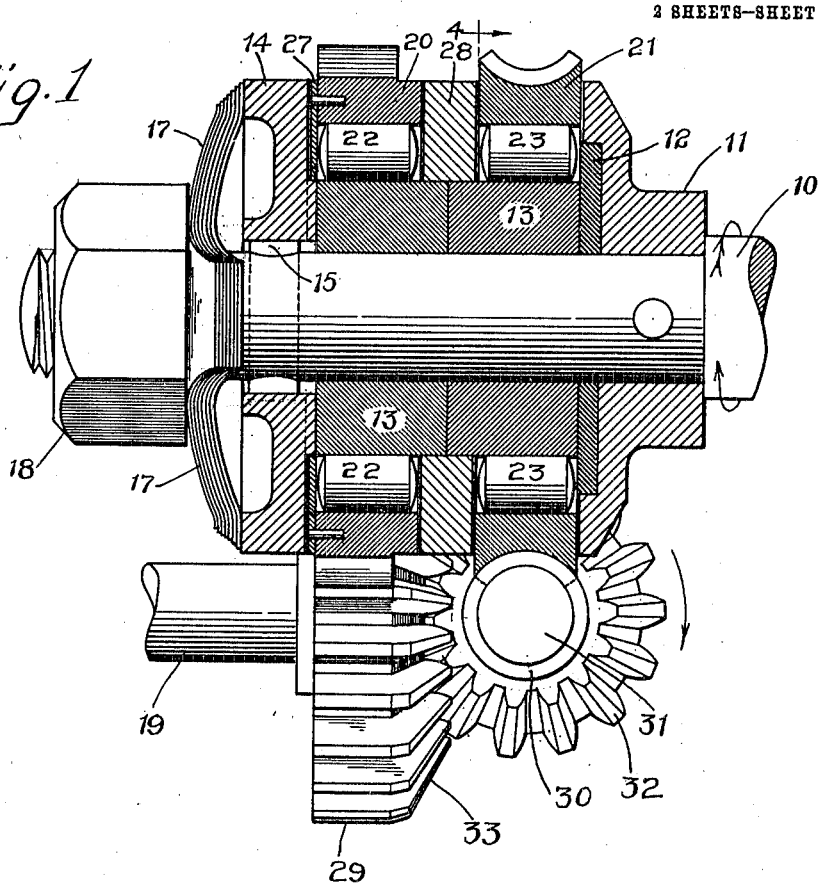
Figure 2:
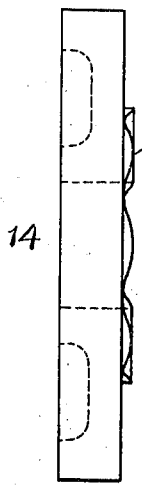

In the accompanying drawings forming a part of this specification, in which similar reference characters denote the same parts in all of the views, Figure 1 is a view partly in elevation and partly in section, illustrating the construction and operation of my novel mechanism; Fig. 2 an edge view of the sliding plate detached; Fig. 3 an elevation as seen from the left in Fig. 1, with the tension nut, spring and sliding plate removed, and Fig. 4 is a section on the line indicated by 4 in Fig. 1, looking in the direction of the arrow.

10 denotes an engine shaft or an extension thereof, 11 a driven member rigidly secured thereto, 12 a friction washer shown as lying in and projecting from a recess in the face of the driven member, 13 a driving member mounted on the shaft adjacent to the friction washer but free to rotate independently thereof and 14 a sliding disk which is held against rotation independently of the shaft, as by means of a pin 15, but is free to slide longitudinally thereon. The driving member is shown as made in two parts for the reason that the inclines of the sets of recesses must extend in opposite directions and it would be expensive to make such a member in one piece. The two parts of the member, however, act as a unit and may be secured together if preferred. For convenience in description I shall refer to the member as a unit. The contiguous faces of the driving member and the sliding disk are provided with radial corrugations 16 (see Figs. 2 and 3) which are held in engagement by a spring 17 which lies intermediate the sliding disk and a tension nut 18 engaging the engine shaft. Any ordinary or preferred type of spring may be used, satisfactory results being secured by the use of a cross-shaped leaf spring. In addition to retaining the corrugations in engagement this spring acts to force the sliding disk against the driving member and to cause the latter to crowd the friction washer against the driven member. The spring is made strong enough to frictionally lock the parts together so that when the driving member is rotated the driven member and engine shaft will be carried with it, or, as will presently be described, the engine shaft will rotate the driving member. By turning the tension nut inward or outward on the shaft the frictional lock between the driving member and the driven member may be made more or less positive.

19 denotes the motor shaft, 20 and 21 driving rings mounted thereon and 22 and 23 sets of rolls which lie intermediate the driving rings and the driving member in recesses 24 and 25, respectively. These recesses are slightly deeper at one end than at the other, forming inclines 26 upon which the rolls travel. It will be noted, compare Figs. 3 and 4, that the inclines in the recesses extend in opposite directions, for a purpose presently to be more fully explained. In order to retain the rolls in driving ring 20 out of contact with the sliding disk, I provide a retaining washer 27 which is secured in any suitable manner, as by pins, to the outer face of the driving ring. This washer lies in a ring shaped depression in the inner face of the disk, said recess being of greater depth than the thickness of the washer. This prevents any contact of the washer with the sliding disk and permits the entire pressure of the spring to be exerted upon the driving member. As shown in Fig. 1, there is considerable space between the driving rings, which may be filled in any suitable manner, as by a washer 28.

Driving ring 20 is provided on its periphery with gear teeth and driving ring 21 with worm teeth which engage respectively a gear wheel 29 on motor shaft 19 and a worm 30 on a shaft 31 which also carries a bevel pinion 32, meshing with a bevel gear wheel 33, shown as formed integral with gear wheel 29.

The operation is as follows: To start the shaft of a gasolene engine, i. e. to turn the engine over, so-called, rotation is imparted to the motor shaft which by means of gear wheel 29 turns driving ring 20 in the direction of the arrow in Fig. 3. There is no connection with the driving member, however, for the reason that the rolls will be carried down the inclines of the recesses and into the relatively deep portion of the recesses leaving the driving member free. Simultaneously, however, through the bevel gear wheel, bevel pinion and worm, rotation at a relatively low speed will be imparted to driving ring 21 in the same direction, as shown in Fig. 4. It will be noted that the inclines in this portion of the driving member extend in the opposite direction from the other set and that rotation of driving ring 21 will cause rolls 23 to travel up the corresponding inclines and thereby communicate motion to the driving member which in turn, through the action of the spring, sliding ring and friction washer, communicates its motion to the driven member and engine shaft. The instant the engine starts, the condition just described will be reversed. The engine shaft will cause the driving member to rotate much faster than it was being driven by the worm and driving ring 21. This will disconnect driving ring 21 from the driving member as rolls 23 will instantly drop back into the deep portions of the recesses. The instant this release of driving ring 21, however, takes place, driving ring 20 will be engaged as rolls 22 will be caused to travel up the inclines and will pick up driving ring 20 and by means of gear wheel 29 communicate rotation to the motor shaft which will automatically transform the motor into a generator. Should the engine back-fire, the effect of which is a sharp blow as compared with the relatively slow movement required to start an engine, the shaft will be instantly driven backward carrying the driven member and the sliding disk with it, but the driving member will still be held by driving ring 21 and its connections with the motor shaft. The spring now yields and permits the corrugations on the inner face of the sliding disk to slip over the corresponding corrugations on the driving member until the force of the back-fire is exhausted, after which the corrugations will lock again and the engine shaft will be carried as before by the worm, driving ring 21 and the driving member. Briefly, then, in starting an engine, power is communicated from the motor shaft to the engine shaft at a low speed through the worm, driving ring 21 and the driven member. When the engine is normally running, the motor shaft will be driven thereby at a relatively high speed through the driving member, driving ring 20 and gear wheel 29. In the event of a back-fire in starting an engine, the engine shaft will be driven backward, the driving member will be held against backward rotation by the traveling of the rolls corresponding with driving ring 21 up the inclines and the consequent locking of the driving member to driving ring 21, which in turn will be locked by the worm, bevel pinion, bevel gear and motor shaft, and the driven member, sliding disk and spring will be carried backward with the engine shaft, the springs allowing the corrugations on the sliding disk to ride over the corresponding corrugations on the driving member.

Having thus described my invention I claim:

1. Mechanism of the character described comprising a driving member having peripheral recesses with inclines extending in opposite directions, driving rings outside the driving member, rolls between the inclines and the rings, a driven member with which the driving member has frictional engagement, means for retaining said members in engagement and driving connections at fast and slow speeds engaging the driving rings respectively.

2. Mechanism of the character described comprising a driving member, a driven member, yielding means bearing against the driving member for locking said members together by frictional engagement, driving rings, rolls intermediate said members and rings, and fast and slow speed driving connections engaging said rings respectively.

3. Mechanism of the character described comprising a driving member having peripheral recesses with inclines extending in opposite directions, driving rings, rolls between the inclines and the rings, a driven member with which the driving member has frictional engagement, a sliding disk bearing against the driving member, a retaining washer for the rolls, a spring bearing against the disk and fast and slow speed driving connections engaging said rings respectively.

4. Mechanism of the character described comprising a driving member having peripheral recesses with inclines extending in opposite directions, driving rings, rolls between the inclines and the rings, a driven member, a friction washer between said members, a sliding disk, a spring acting to hold the disk and the driving and driven members in frictional engagement, and fast and slow speed driving connections engaging the driving rings respectively.

5. Mechanism of the character described comprising a driving member having peripheral recesses with inclines extending in opposite directions, driving rings, rolls between the inclines and the rings, a driven member, a sliding disk, means for retaining the rolls in the driving ring contiguous to the sliding disk against endwise displacement, yielding means for locking the sliding disk and the driving and driven members together by frictional engagement and fast and slow speed driving connections engaging the driving rings respectively.

6. Mechanism of the character described comprising a driving member having peripheral recesses with inclines extending in opposite directions, driving rings, rolls between the inclines and the rings, a driven member, a sliding disk bearing against the driving member, a spring bearing against the disk and acting to lock the members together by frictional engagement and fast and slow speed driving connections engaging the driving rings respectively.

7. Mechanism of the character described comprising a driving member having peripheral recesses with inclines extending in opposite directions, driving rings, rolls between the inclines and the rings, a driven member, yielding means bearing against the driven member for locking the members together by frictional engagement and fast and slow speed driving connections engaging the driving rings respectively.

8. Mechanism of the character described comprising a driven member, a driving member contiguous thereto and provided at its outer end with radial corrugations, a sliding disk having corresponding corrugations, a spring bearing against the disk for locking the driving and driven members together by frictional engagement, and fast and slow speed driving connections for said members respectively.

9. Mechanism of the character described comprising a driven member, a driving member having radial corrugations, a friction disk between said members, a sliding disk having corrugations corresponding with the driving member, a spring bearing against the disk and fast and slow speed driving connections for the driving and driven members respectively.

10. Mechanism of the character described comprising a driving member having radial corrugations at one end and peripheral recesses with inclines, driving rings, rolls between the inclines and the rings, a driven member, a sliding disk having corrugations corresponding with the driving member, a spring bearing on the disk and acting to lock the members together by frictional engagement, and fast and slow speed driving connections engaging the driving rings respectively.

11. Mechanism of the character described comprising a driving member having peripheral recesses with inclines extending in opposite directions, rolls in said recesses, a driven member, a sliding disk, means for holding the disk and the driving and driven members in frictional engagement, driving rings, one of which is provided with gear teeth and the other with worm teeth, a shaft carrying a gear wheel engaging one driving ring and a bevel gear wheel and a shaft carrying a worm engaging the other driving ring and a bevel pinion engaged by the bevel gear wheel.

12. Mechanism of the character described comprising a driving member having peripheral recesses with inclines extending in opposite directions, rolls in said recesses, a driven member, a sliding disk, said sliding disk and the driving member having corresponding radial corrugations, means for retaining said corrugations in engagement and for retaining the driving and driven members in frictional engagement, driving rings, one of which is provided with gear teeth and the other with worm teeth, a shaft carrying a gear wheel engaging one driving ring and a bevel gear wheel and a shaft carrying a worm engaging the other driving ring and a bevel pinion engaged by the bevel gear wheel.

13. Mechanism of the character described comprising a driving member having peripheral recesses with inclines extending in opposite directions, rolls in said recesses, a driven member with which the driving member has frictional engagement, a sliding disk, said disk and driving member having corresponding radial corrugations, a spring bearing on the sliding disk, for the purpose set forth, driving rings, one of which is provided with gear teeth and the other with worm teeth, a shaft carrying a gear wheel engaging one driving ring and a bevel gear wheel and a shaft carrying a worm engaging the other driving ring and a bevel pinion engaged by the bevel gear wheel.

14. A machine of the character described comprising a motor shaft, an engine shaft, a driving ring, low speed connections between the motor shaft and the driving ring, a second driving ring, high speed connections between the motor shaft and said second driving ring and independent connections between the driving rings and the engine shaft whereby, in starting, the engine shaft will be driven at slow speed by the motor shaft and after the engine has started the motor shaft will be driven at fast speed by the engine shaft.

15. Mechanism of the character described comprising a motor shaft, an engine shaft, a driven member secured to the engine shaft, a driving member mounted independently thereon, means for locking said members together by frictional engagement, driving rings and fast and slow speed connections between the motor shaft and the driving rings respectively.

16. Mechanism of the character described comprising a motor shaft, an engine shaft, a driving member having peripheral recesses with inclines extending in opposite directions, driving rings, rolls between the inclines and the rings, a driven member fixed to the engine shaft, means for locking the members together by frictional engagement and fast and slow speed connections between the motor shaft and the driving rings respectively.

17. Mechanism of the character described comprising a motor shaft, an engine shaft, a driving member having radial corrugations and peripheral recesses with inclines extending in opposite directions, driving rings, rolls between the inclines and the rings, a driven member fixed to the engine shaft, a spring controlled sliding disk having corrugations corresponding with the driving member and fast and slow speed connections between the motor shaft and the driving rings respectively.

In testimony whereof I affix my signature in presence of two witnesses.

MERLE MacFARLAND.

Witnesses:
JOHN McE. AMES,
L. V. JOYCE.